United States Patent [19]
Zacharias, Jr. et al.

[11] 3,715,709
[45] Feb. 6, 1973

[54] SING-AROUND VELOCIMETER

[75] Inventors: Ellis M. Zacharias, Jr.; Uldis Cirulis, both of Paramus, N.J.

[73] Assignee: Nusonics, Inc., Paramus, N.J.

[22] Filed: Jan. 14, 1970

[21] Appl. No.: 2,719

Related U.S. Application Data

[63] Continuation-in-part of Ser. No. 853,465, Aug. 27, 1969, abandoned.

[52] U.S. Cl..................340/3 E, 181/.5 AP, 340/5 S
[51] Int. Cl..............................................H04b 11/00
[58] Field of Search......340/1, 3, 3 E, 5 S; 181/.5 AP

[56] References Cited

UNITED STATES PATENTS

| | | | |
|---|---|---|---|
| 3,341,808 | 9/1967 | Levin et al................................340/5 |
| 3,482,647 | 12/1969 | Lynch et al...........................181/0.5 |
| 3,100,885 | 8/1963 | Welkowitz et al........................340/3 |

OTHER PUBLICATIONS

Tschiegg et al., Journal of the Acoustical Soc. Amer., Vol. 31, No. 7, July 1959, pp. 1038–1039.

Dulberger, Electronics, Vol. 34, No. 22, June 2, 1961, pp. 41–43

*Primary Examiner*—Richard A. Farley
*Attorney*—Samuelson & Jacob

[57] ABSTRACT

A sing-around velocimeter having a fixed sound path length so that the repetition rate is a function of the velocity of sound in the fluid and consequently of the characteristics of the fluid. A digital latch is employed to control the application of a signal to the transmitting transducer as determined by the signal received by the receiving transducer or by a free running oscillator if no signal is received.

The probe used in the velocimeter has a fixed path length and is shaped so that spurious signals are not received by the receiving transducer. A pair of reflectors and the transducers are mounted in a ring of fixed radius to maintain the path length constant. In one construction, the probe is capable of being inserted in a breaker or similar vessel to measure the characteristics of the contents. A similar construction is used for insertion in a pipe containing flowing fluid to measure the fluid's characteristics.

17 Claims, 15 Drawing Figures

Fig_2A

Fig.2B

INVENTORS
ELLIS M. ZACHARIAS, JR.
ULDIS CIRULIS

BY Samuelson & Jacob
ATTORNEYS

INVENTORS
ELLIS M. ZACHARIAS, JR.
ULDIS CIRULIS
BY
*Samuelson & Jacob*
ATTORNEYS

SING-AROUND VELOCIMETER

This application is a continuation-in-part of our copending application for Letters Patent of the United States Ser. No. 853,465, filed August 27, 1969 now abandoned.

The invention relates to velocimeters for measuring fluid characteristics by measuring the propagation velocity of sound in the fluid. More particularly, the invention is directed toward such velocimeters which utilize the sing-around principle and in which the probe is constructed so that the sound path length remains constant. Probes of the invention may be made for insertion in beakers or similar vessels for measuring the characteristics of static fluids or they may be made for insertion in a pipe for measuring the characteristics of moving fluids. When such probes are inserted in pipes, they may be used to detect changes in fluid characteristics including detection of the interface between two different fluids which are being moved serially in the pipe.

The velocimeter of the invention utilizes the sing-around principle wherein a sound pulse is transmitted through the medium, generally a fluid (either gas or liquid), and the receipt of the sound pulse initiates the transmission of a second sound pulse and so long as sound pulses are received, the velocimeter continues to initiate sound pulses. If no sound pulse is received within a predetermined period of time, a sound pulse is initiated by a free running, signal generator whose frequency is lower than any sound repetition rate which may be expected.

It is an important object of the invention to provide a sing-around velocimeter utilizing a digital latch to control the application of a signal to the transmitting transducer as determined by the signal received by the receiving transducer or by a free running oscillator if no signal is received.

It is also an object of the invention to provide a probe which in its preferred form utilizes tow electroacoustic transducers (one for transmitting and one for receiving) and two reflectors mounted on a ring so that the sound path length is fixed. The transducers and reflectors are placed such that the sound signals initiated by the transmitting transducer are reflected by the first reflector to the second reflector and by it to the receiving transducer. The location of the transducers is such that the sound pulses transmitted by the transmitting transducer are precluded from being received directly by the receiving transducer. The sound path length of this preferred form of probe is approximately equal to $r(4+\sqrt{2})$ where $r$ is the inner radius of the ring.

It is a further object of the invention to prevent receipt of spurious signals by the receiving transducer through the reflection of sound signals by the wall of the ring. This is accomplished by pitching the inner wall of the ring upward at an angle. The angle is sufficiently large to direct the spurious signal completely out of the ring and into a volume of the medium which will not rereflect the sound signal back toward the receiving transducer.

It is a still further object of the invention to prevent transmission of sound pulses from the transmitting transducer through the ring to the receiving transducer. This is accomplished by forming the ring of two pieces which are isolated from each other by material having poor acoustic transmission quantities and mounting one of the transducer in one piece and the other transducer in the other piece.

It is a still further object of the invention to provide a probe wherein the adjustment of the orientation of the reflectors is readily accomplished so as to be able to attain maximum signal transmission through the fluid medium from the transmitting transducer to the receiving transducer.

These and other objects, features, advantages and uses will be apparent during the course of the following description when considered together with the accompanying drawings wherein:

In the drawings, wherein, for the purpose of illustration, are shown preferred embodiments of the invention, the numeral 20 designates the electronic circuit of the invention, generally. Circuit 20 operates in combination with transmitting transducer 22 and receiving transducer 24. There transducers are electroacoustic transducers and while they generally are reversible, it is sufficient that the transmitting transducer convert electrical signals into sound signals and that the receiving transducer convert sound signals into electrical signals. The reversible type, electroacoustic transducer will perform either of these functions depending upon the type of signal which is applied to it.

In the preferred forms of probes of the invention, described hereafter, the transducers are discs which are formed of polarized, electrostrictive, ceramic material in a manner which is well known in the art. The transducers are excited in thickness mode at a nominal frequency of 3.6 MHz. Other vibrational modes such as the shear mode may be used if desired.

Circuit 20 is seen to comprise (FIG. 1): transducer driver 26, latch 28 which is comprised of integrated circuit gates 30 and 32, integrated circuit gates 34, 36, 38 and 40, free running oscillator 44, reset oscillator 42, variable gain amplifier 46 and threshold detector 48. Peak detector 50, differential amplifier 52, meter 54 and switch 56 are utilized to calibrate the instrument. Sensitivity control 58 is adjusted for instrument calibration and control 60 permits adjustment of the time that latch 28 remains in its "set" state.

Figure 1:
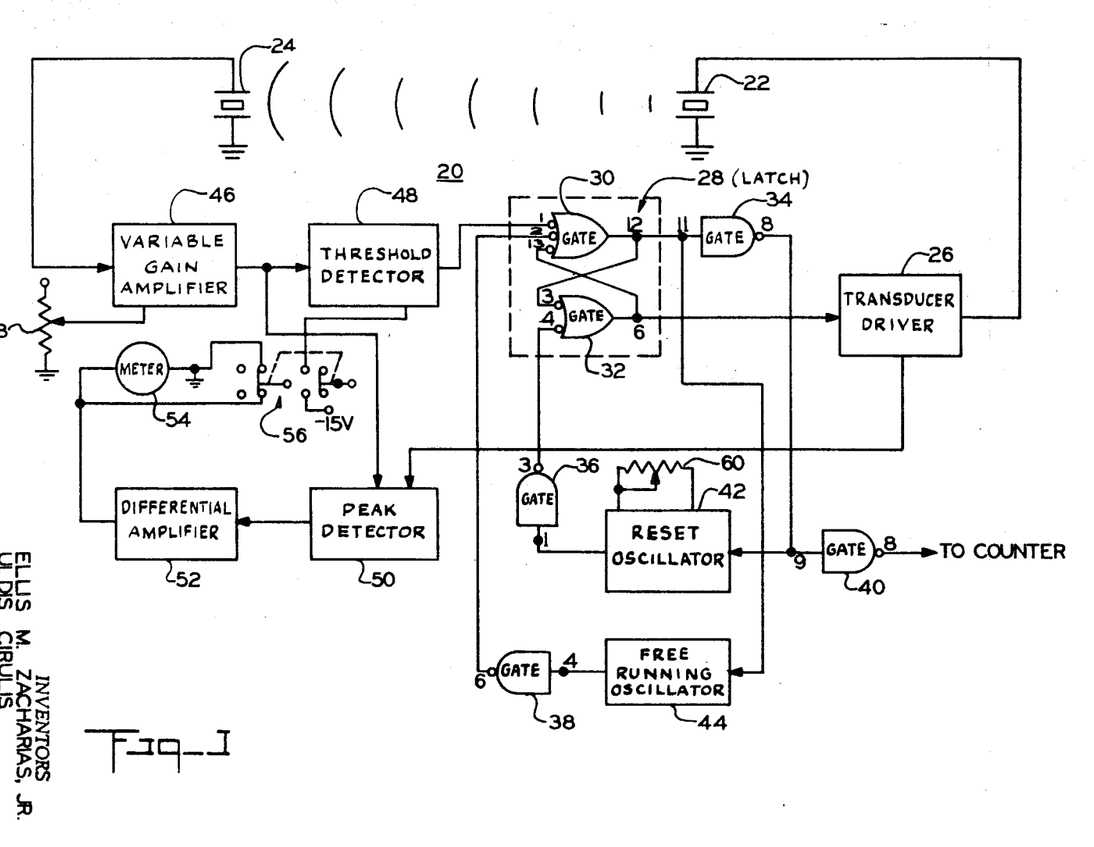
FIG. 1 is a simplified, functional, block diagram of the velocimeter circuit of a preferred form of the invention.

Gates 30, 32 and 34 are a part of a single integrated circuit and gates 36, 38 and 40 are a part of another integrated circuit. They are made in a manner which is well known in the art and the particular mounting and combination of particular gates within a single integrated circuit is for manufacturing and operating convenience.

In operation, the transducers 22 and 24 are in contact with the medium which is under investigation and the sound path is a fixed length. More particularly, the sound path is submerged in the fluid medium and a pulse of electrical energy is initiated by oscillator 44 and fed through transducer driver 26 to be applied to transducer 22 which transmits a pulse of acoustic energy through the medium. The sound pulse is transmitted through the medium over a fixed path length and is received by receiving transducer 24. The sound pulse is converted to an electrical pulse by transducer 24. The electrical pulse is amplified and used to generate another pulse of acoustic energy. The repetition rate (sing-around frequency) is a function of the transit time of the acoustic pulse over the sound path and is therefore a measure of the propagation velocity through the medium.

Digital latch 28 is comprised of two multiple input gates 30 and 32 connected so that if a temporary input is applied to one of them, the resultant output will be maintained even though the initiating signal is no longer present at the input. This condition (the set state) will remain until the other gate receives the required input to restore the gates to their original state (reset state). The integrated circuit gates used in the circuit of FIG. 1 have various terminals, some of which are not used, and they are not shown. All of the gates used in the present circuit are of the polarity reversing type, namely, the output polarity is opposite to that of the input polarity. This is shown by using an open terminal indication at either the output or input and a closed terminal indication at the other termination of the gate. For simplicity, the terminal numbers on the commercially available integrated circuits are used on the figures of the application.

For example, latch 28 is in its reset state when terminals 1, 2, 13 and 4 are at +.5 volts and terminal 3 is at 0 volt. If a negative pulse is applied to terminal 1 or terminal 2, the output at terminal 12 will change from 0 volt to +5 volts. This produces a +5 volts input at terminal 3 which changes the output at terminal 6 from +5 volts to 0 volt. As a result, terminal 13 is not at 0 volt, thereby preventing the output at terminal 12 from returning to 0 volt. The latch is now in its set state and can only return to its reset state by applying a 0 volt input to terminal 3 or terminal 4 which returns terminal 13 to +5 volts.

A transition from +5 volts to 0 volt at terminal 6 of latch 28 causes transducer driver 26 to shock excite transducer 22 which causes it to vibrate at its resonant frequency (3.6 MHz, nominal) thereby producing sinusoidal pulses in the medium. The acoustic pulses impinge on transducer 24 which converts them into corresponding electrical signals which are amplified by variable gain amplifier 46. When the first pulse of the group is amplified to a predetermined threshold level, gated threshold detector 48 generates a negative pulse which is applied to terminal 1 of gate 30. This puts latch 28 in its set state and puts +5 volts at terminal 12 of gate 30, 0 volt at terminal 8 of gate 34, and +5 volts at terminal 8 of gate 40 (the input of the counter). Since the counter is not a part of the invention and since any type of digital counter may be used, no details of the counter are shown.

Figure 2A:
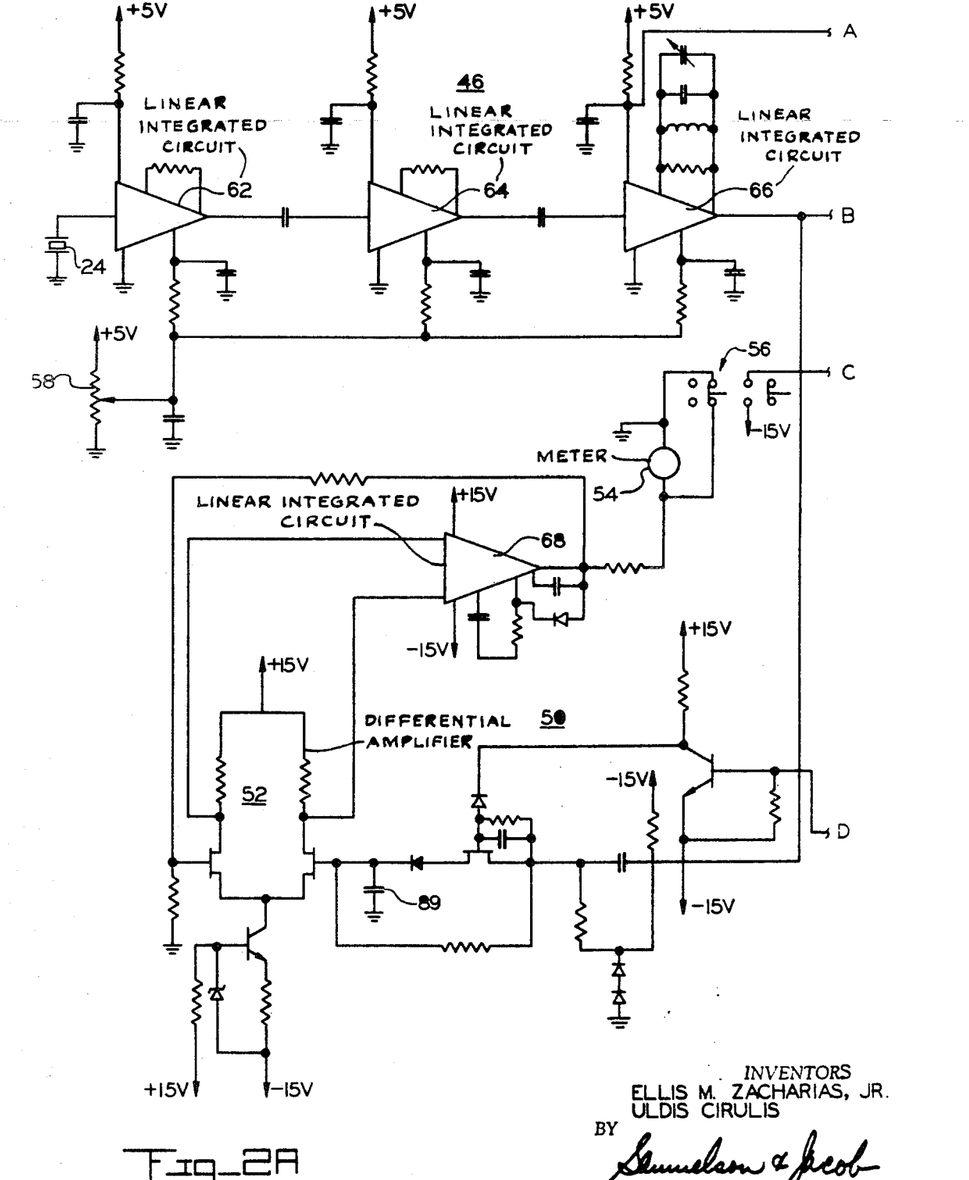
FIGS. 2A and 2B together are a detailed, schematic diagram of a preferred velocimeter circuit joined at the points A, B, C and D on the figures.
Figure 2B:
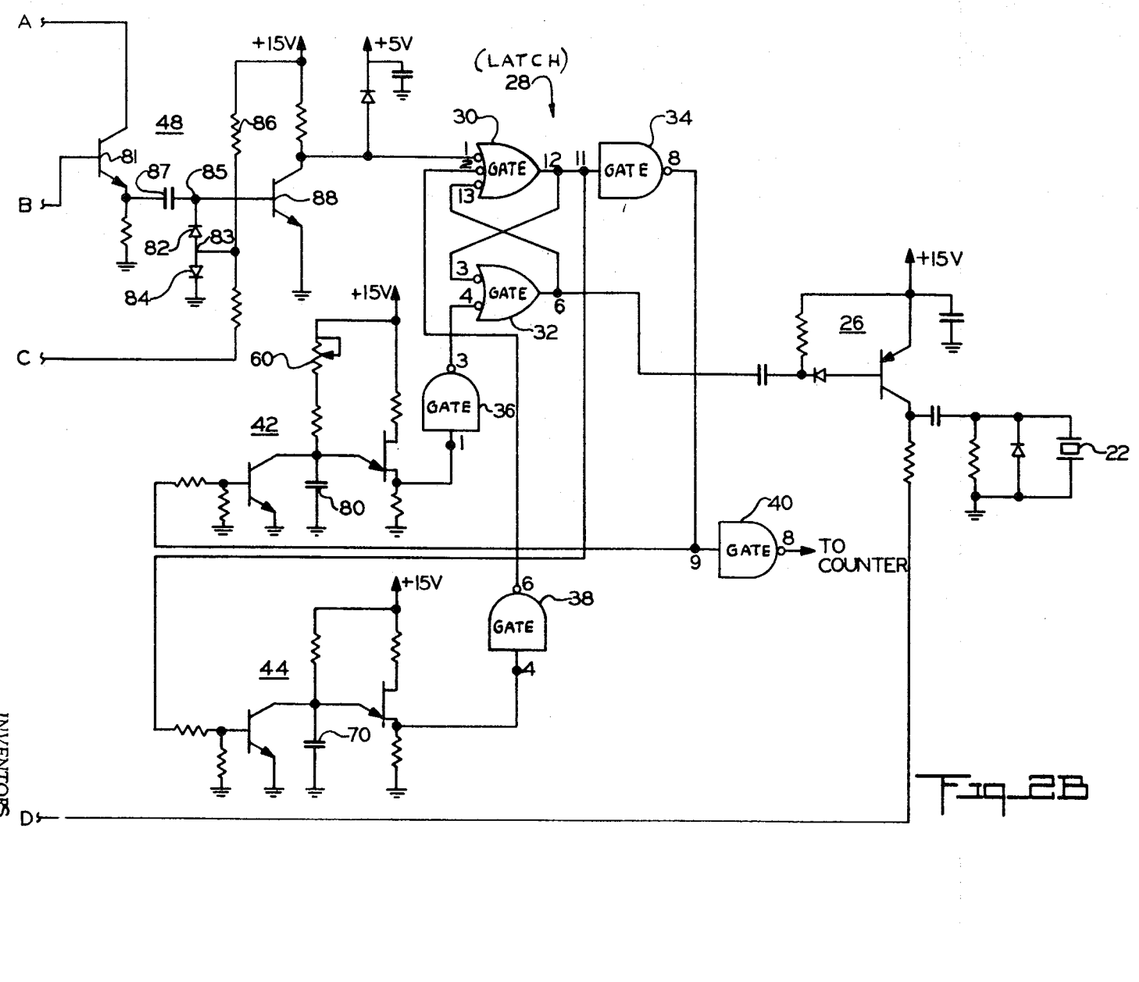

At the time latch 28 is reset, the following functions occur (FIGS. 1, 2A and 2B);

1. The 0 volt output at terminal 12 of gate 30 causes capacitor 70 of oscillator 44 to begin to charge. Oscillator 44 is a relaxation type unijunction oscillator.
2. The condition at terminal 8 of gate 40 changes from +5 volts to 0 volt (input to the counter).

Elements 62, 64, 66 and 68 are standard linear integrated circuits which are not part of the invention and will therefore not be discussed.

Latch 28 will remain in its reset state until the voltage at terminal 1 or terminal 2 of gate 30 changes from +5 volts to 0 volt. This can be caused either by capacitor 70 becoming fully charged to thereby produce a negative pulse at terminal 2 or gate 30 or by the pulses from receiving transducer 24 causing a negative pulse to be applied to pin 1 of gate 30 by threshold detector 48.

If the latch 28 is set by threshold detector 48, the output voltage at terminal 12 of gate 30 will change from +5 volts to 0 volt and the velocimeter will be singing around. If the free running oscillator 44 sets latch 28 by applying a negative pulse to terminal 2 of gate 30, the transducer 22 will also be excited and the velocimeter will be operating at its free running frequency (3.5 KHz). The occurrence of either of the above will preclude the other from having an effect on the condition of latch 28, depending on which occurs first.

Figure 3:
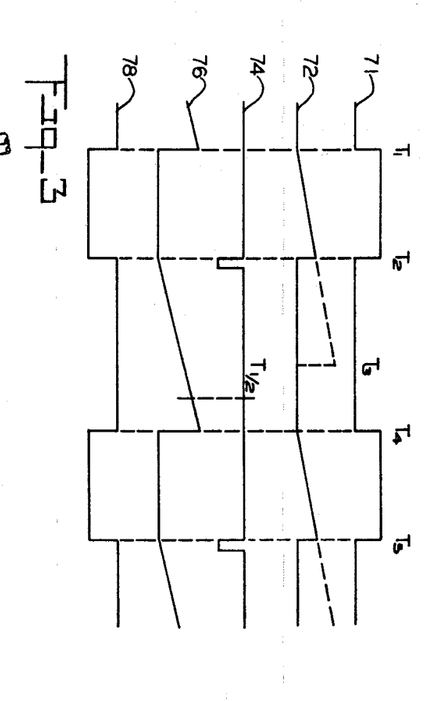
FIG. 3 is a time plot at various points of the circuit of FIGS. 2A and 2B.

FIG. 3 is a time plot which illustrates the normal condition when the velocimeter is singing around. Curve 71 is a plot of the voltage at terminal 6 of gate 32 against time (input to transducer driver 26). Curve 72 is a plot of the charge on capacitor 70 against time. Curve 74 is a plot of the voltage on pin 1 of gate 30. Curve 76 is a plot of the charge on capacitor 80 of relaxation type unijunction reset oscillator 42 against time. Curve 78 is a plot of the voltage at terminal 8 of gate 40 (input to the counter) against time.

In the timing diagram of FIG. 3 the pulse from threshold detector 48 is shown being applied to terminal 1 of gate 30 prior to capacitor 70 becoming fully charged. This is the normal condition for singing around. The frequency of the reset oscillator 42 is varied by the range control 60 between nominal values of 12 and 70 kHz. The pulse width, which is generated as a control voltage, varies between approximately 85 and 15 microseconds.

At $T_1$ latch 28 is reset, terminal 6 of the latch is at +5 volts and capacitor 70 begins to charge. At $T_2$ the transduced acoustic pulse is sensed by threshold detector 48 and a negative pulse appears at terminal 1 of gate 30, setting the latch 28. Latch 28 would have been set by oscillator 44 at $T_3$ (when capacitor 70 became fully charged) if the event had not occurred at $T_2$, capacitor 80 begins to charge and when it is fully charged ($T_1$ and $T_4$), the latch is reset and the sequence begins again.

In order to stabilize operation, reset oscillator 42 is provided with a range control 60 which is adjusted to control the amount of time that latch 28 will remain in the set state. Latch 28 must remain in the set state for more than half the time between $T_2$ and $T_5$ ($T_{1/2}$). If latch 28 resets too quickly after $T_2$ (earlier than $T_{1/2}$), spurious noise could cause the velocimeter to sing around at multiples of its sing-around frequency.

Diodes 82 and 84 and resistor 86 form a d-c restorer. Junction 83 is held at 0.6 volt and, therefore, junction 85 is held at ground potential. Spurious noise will be present at junction 85 but transistor 88 will not be turned on until a positive pulse of more than 0.6 volt appears at capacitor 87. The collector of transistor 88 is clamped at +5 volts so that the positive pulse at capacitor 87 must be of sufficient energy to overcome the 3.0 ma at the collector of transistor 88. When this occurs, a negative pulse is applied to terminal 1 of gate 30.

Peak detector 50 is utilized to calibrate the system. It measures the highest amplitude present at the output of amplifier 46. When the system is to be calibrated, switch 56 is depressed. This unlocks threshold detector 48 from the circuit and enables the unit to run at its free running frequency (3.5 kHz). Calibration is done at the free running frequency since it is much lower than any sound velocities which would be measured.

When the amplitude, to be measured, appears at the output of amplifier 46, there is a longer time lapse before oscillator 44 resets latch 28 to cause transducer driver 26 to excite transducer 22. This time lapse is needed because transducer driver 26 inhibits peak detector 50 each time it fires and thereby prevents ground loop voltages from being stored on capacitor 89 which action could interfere with the measuring process.

The signal (in the calibrate position) is fed to differential amplifier 52 from peak detector 50. Amplifier 52 is a lowdrift, null meter, driver amplifier whose output is connected to meter 54. When the switch 56 is pushed to "calibrate", the short circuit is removed from meter 54 so it measures the output of amplifier 52. The meter 54 is set to null (zero current flow) by adjusting sensitivity control 58 which is connected at the input of amplifier 46.

Figure 9:
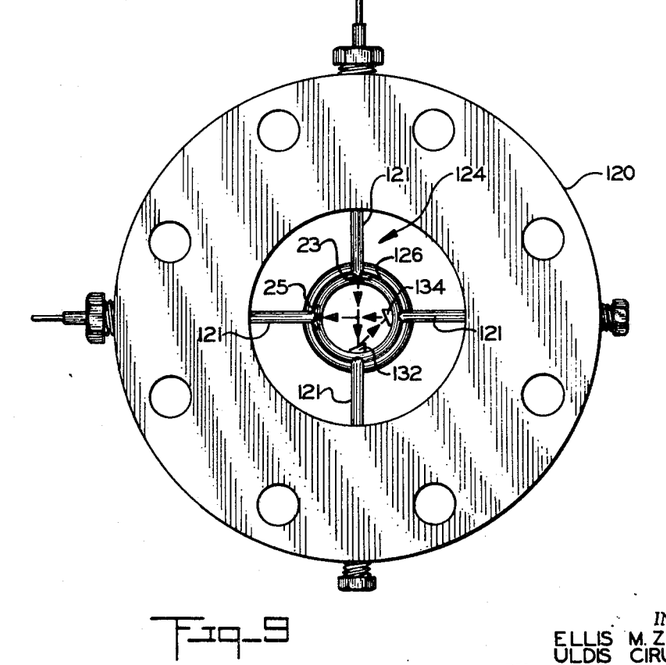
FIG. 9 is an end elevational view of a pipe flange with a probe of the invention installed therein.
Figure 10:
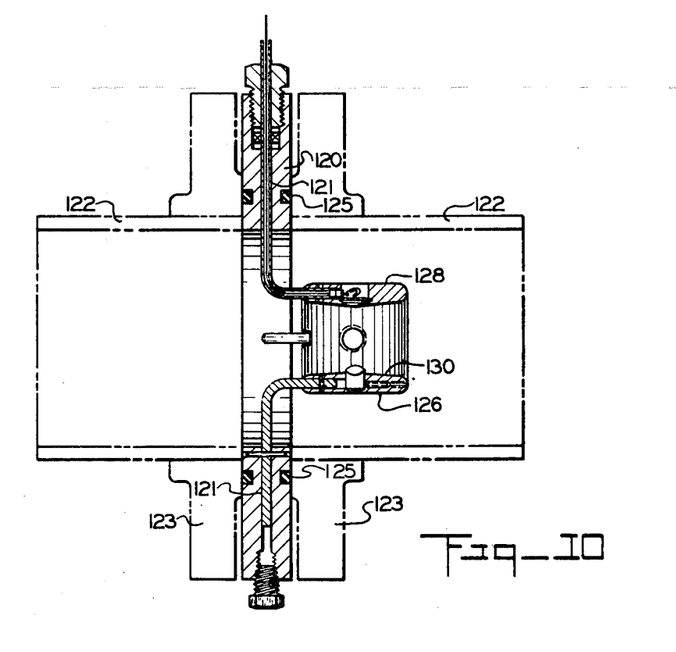
FIG. 10 is a longitudinal sectional view of a pipe flange of FIG. 9 with a probe of the invention installed therein.
Figure 11:
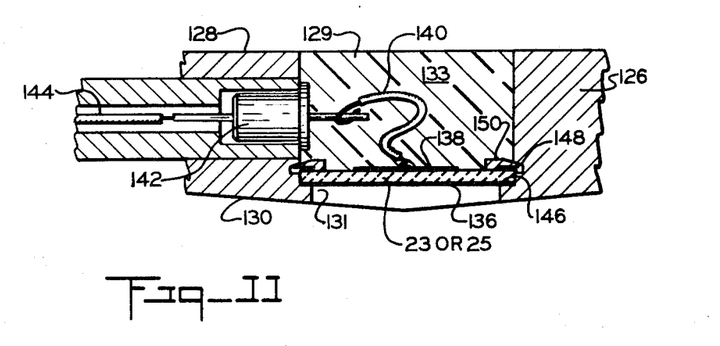
FIG. 11 is an enlarged sectional view of a transducer used in the probes of FIGS. 9 and 10.

Most important in the stable operation of velocimeters of the invention is the maintenance of a consistent sound path length. Two-preferred types of probes, which are utilized to accomplish this object, are illustrated in the drawings. The probe of FIGS. 4-8 is used for insertion in beakers or similar vessels for the measurement of sound velocity in static fluids. The probe of FIGS. 9-11 is used for installation in pipes for the measurement of sound velocity in flowing fluids.

Figures 4, 5, 6:
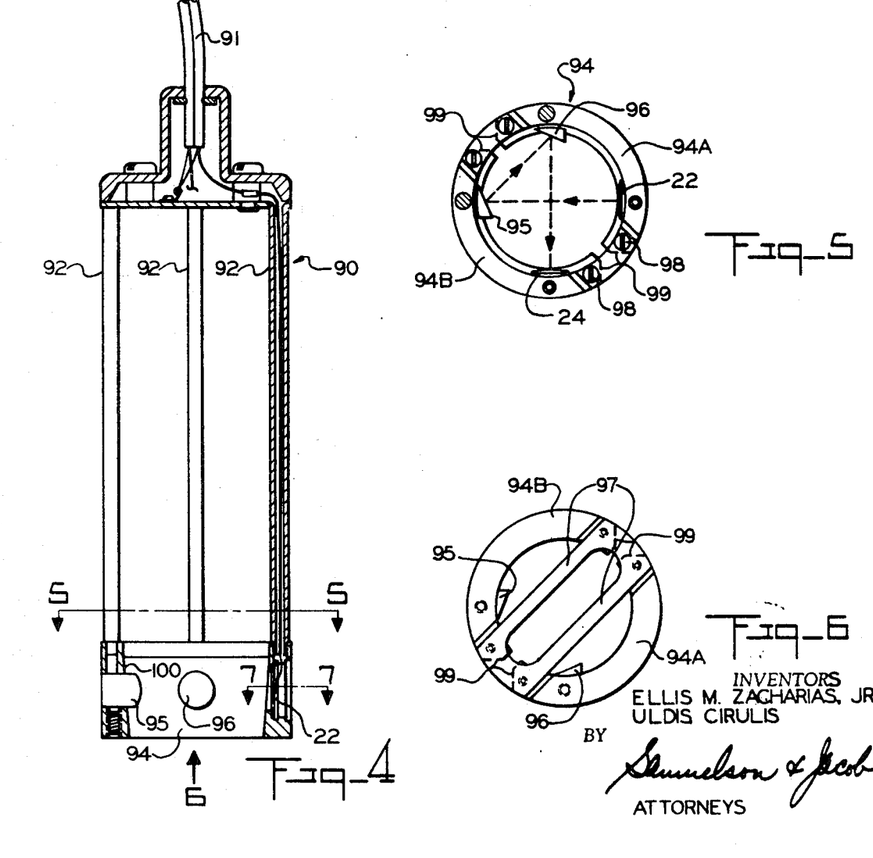
FIG. 4 is an elevational view, partly in section, of a probe of the invention used for insertion in a beaker or similar vessel.
FIG. 5 is a sectional view along the line 5—5 of FIG. 4, viewed in the direction of the arrows.
FIG. 6 is a view in the direction of arrow 6 of FIG. 4.

Probe 90 (FIG. 4) is seen to comprise legs 92 and ring 94. Two of the legs 92 are hollow to carry the electrical leads from transducers 22 and 24 to cable 91 and thence to the electronic circuit which has been described above. The ring 94 is dimensionally stable and transducers 22 and 24 are mounted therein together with reflectors 95 and 96. The sound path is shown in FIG. 5. The sound pulse from transducer 22 goes through the medium to reflector 95 which is pitched at an angle of about 22.5° so that it reflects the pulse to reflector 96. Reflector 96 is similarly pitched so that it reflects the pulse to receiving transducer 24. It is seen that transducer 24 is precluded by this construction from receiving any pulses directly from transducer 22. The sound path length is approximately $r(4 + \sqrt{2})$ where r is the inner radius of ring 94.

Operation can be improved by eliminating any possibility of spurious signals due to reflections off the inner wall of the ring impinging on the face of transducer 24. This is accomplished by sloping the inner wall 100 of ring 94 as shown in FIG. 4. Now, the portion of any pulse, which does not reach the reflectors, will be reflected upwards, due to the slope of the inner wall, and will not impinge on the receiving transducer 24. The sound beam is wider than the reflectors and only the central portion of the beam is reflected serially through the sound path. The portion of the beam, which falls outside the reflector strikes the inclined wall and is directed out of the plane of the sound path.

Further improvement in operation may be obtained by eliminating the possibility of shock excitation of the receiving transducer by the transmitting transducer directly through the ring 94. This is eliminated by forming ring 94 of two arcuate section 94A and 94B. Transducer 22 is mounted in one sections and transducer 24 is mounted in the other section. Arcuate sections 94A and 94B are joined by clamps 97 which are held in place by screws 98. A material having high acoustic loss is placed between the clamps 97 and the ring sections 94A and 94B to minimize any acoustic coupling between the sections. The screws 98 are run through sleeves of material having high acoustic loss to further minimize the likelihood of any transmission through the mounting. The walls of the sections 94A and 94B are tapered as shown at 99 so that the vibrations in one of the ring sections will be coupled into the fluid medium and away from the other section. Any energy transmitted from one of the sections to the other will strike the inclined surface and most of the energy will be reflected into the liquid medium rather than being coupled into the other section. Thus, sound signals are essentially, and for all practical purposes, precluded from being transmitted within the ring from one of the arcuate sections to the other.

Figure 7:
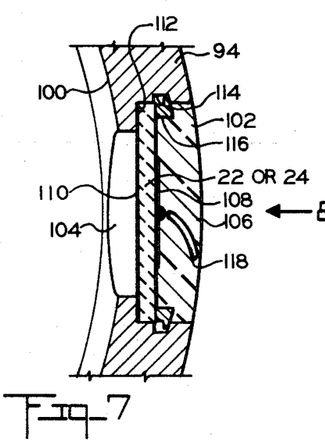
FIG. 7 is an enlarged sectional view taken on the lines 7—7 of FIG. 4, viewed in the direction of the arrow.
Figure 8:
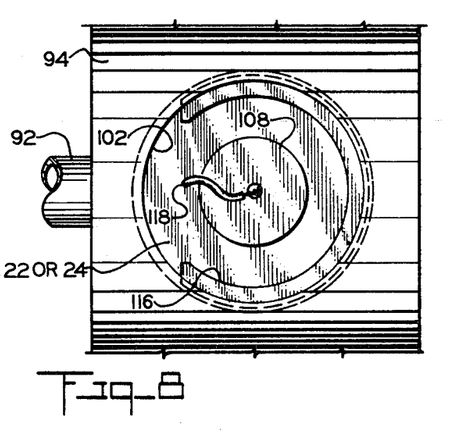
FIG. 8 is a view in the direction of arrow 8 of FIG. 7, with the epoxy removed from behind the transducer to show the internal construction.

FIGS. 7 and 8 illustrate a preferred construction for mounting transducers 22 or 24 in ring 94. Ring 94 has an inner wall 100 and an outer wall 102 which are provided with openings 104 and 106, respectively. The transducer is provided with suitable electrodes 108 and 110 and electrical lead 118. The transducer is fitted through the opening 106 in the outer wall so that electrode 110 fits against ledge 112 and is in good electrical contact therewith. Now, a resilient, C-ring 116 of stainless steel or similar material is forced against the transducer and is fitted into groove 114. This holds the transducer in place. Preferably, after the transducer is in place, the opening behind the transducer is filled with epoxy such as is shown in FIG. 7.

It should be noted that the area of electrode 108 is small enough so that it does not make contact with ring 94 which is formed of metal and would short circuit the transducer. While this electrode construction reduces the effective size of the transducer and consequently, its transmission capabilities, the transducer is able to transmit sufficiently strong pulses for the purpose of sound velocity measurement in the particular environment.

Figure 12:
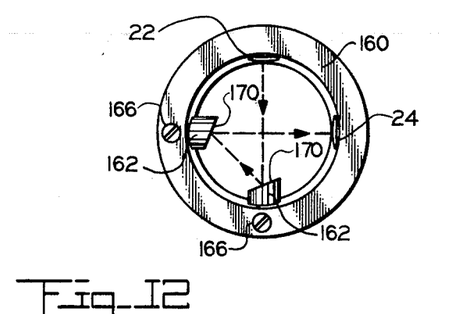
FIG. 12 is a view similar to that of FIG. 5 of an alternative construction of the ring in which the transducers and reflectors are mounted.
Figure 13:
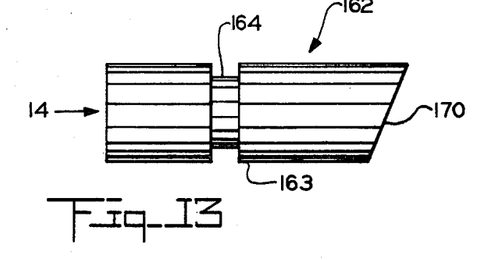
FIG. 13 is an enlarged, plan view of a reflector assembly which is mounted in the ring of FIG. 12.
Figure 14:
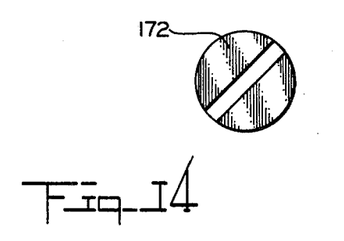
FIG. 14 is an end view of the reflector assembly of FIG. 13, viewed in the direction of arrow 14 of FIG. 13.

The alternative embodiment of FIGS. 12 through 14 may be used to simplify adjustment of the reflectors in the ring. Ring 160 is formed of dimensionally stable material and transducers 22 and 24 and reflector assemblies 162 are mounted therein. The ring 160 may be formed of a single, integral piece as shown in FIG. 12 or it may be formed of two arcuate pieces as has been described heretofore. The inner wall may be vertical and parallel with the outer wall or it may be sloped as has been previously pointed out in the description of the previous construction.

Each reflector assembly 162 comprises a body 163 which is circumferentially slotted, as shown at 164, a reflecting surface 170 and a slotted end 172. Screws 166 engage the respective slots 164 to hold the reflectors in position. Reflecting surface 170 is generally cut at an angle of about 22.5°.

To adjust the position or orientation of the reflecting surfaces 170, as desired, with respect to each other and transducers 22 and 24, screws 166 are loosened so that when a screwdriver or similar tool is inserted in the slot in end 172, the reflector assembly will rotate freely. A signal is applied to transducer 22 and each reflector assembly is now rotated until a maximum output is obtained at the output of amplifier 46. The reflector assemblies are then locked in place by tightening screws 166.

The velocimeter of the invention may also be used to measure the velocity of sound in a flowing fluid. A preferred construction of probe for this purpose is illustrated in FIGS. 9—11.

Probe 124 is mounted in pipe insert 120 which is inserted between two pipe sections 122 by means of nuts and bolts or any other standard means well-known in the plumbing art. Leakage between the sections is prevented by 0-rings 125 which are formed of neoprene or any other suitable material. Ring 126, which is part of probe 124, has an outer wall 128 and an inner wall 130 which is sloped as shown in FIG. 10. This slope prevents spurious signals from being received by the receiving transducer. Transmitting transducer 23 (similar to transducer 22), receiving transducer 25 (similar to transducer 24), reflector 132 and reflector 134 are mounted in ring 126. The operation of probe 124 is the same as that of probe 90 except that it is permanently placed in the pipe and measures the velocity of sound in the fluid flowing in the pipe.

Probe 124 is used to detect changes in the characteristics of a flowing fluid as well as to detect the interface between two fluids which are flowing serially in the pipe. The probe may be removed by stopping the flow, emptying that portion of the pipe and removing the pipe insert 120 in which the probe is mounted. If the two pipe sections 122 cannot be drawn together so as to be leakproof, a spacing insert of the proper size must be inserted in place of pipe insert 120.

Probe 124 is held in place in pipe insert 120 by means of struts 121, two of which are hollow and carry the electrical leads from the transducers for connection to the associated electronic circuitry.

Transducer 23 or 25 is mounted in ring 126 as shown in FIG. 11. Ring 126 is provided with an opening 131 in its inner wall 130 and an opening 129 in its outer wall 128.

Electrode 136 is applied to the whole face of the transducer and makes contact with ledge 146. Since ring 126 is electrically conductive, this contact serves as the ground connection to the transducer. Electrode 138 is similar to electrode 108 and does not make contact with the ring. C-ring 150, which is similar to C-ring 116, fits in groove 148 and holds the transducer in place.

Opening 129 is filled with epoxy resin 133 or other suitable material which serves as a sealing compound and for pressure relief. The material should be chemically compatible with the fluid flowing in the pipe. Feed-through terminal 142 serves to seal the transducer and to carry the electrical connection from lead 140 to lead 144.

It can be seen that the characteristics of the medium may be determined by measuring the velocity of sound in it.

By way of illustration, and not by way of limitation of the scope of the invention, following are some examples of the sound velocities in various fluids which have been measured with velocimeters of the invention:

| Medium | Sound Velocity (meters per second) |
| --- | --- |
| Distilled Water | Approximately 1400—1540 depending on temperature |
| 85% Distilled Water and 15% Polyethylene Glycol | Approximately 1610—1575 depending on temperature |
| 0.08 Molar Concentration Ethyl Alcohol in Water | Approximately 1610—1575 depending on temperature |
| Type K, Philadelphia Quartz Co., Liquid Sodium Silicate | Approximately 1930—1965 at a fixed temperature of 31°C depending on concentration |
| Type K, Philadelphia Quartz Co., Liquid Sodium Silicate | Approximately 1955—1948 at mean concentration depending on temperature |

For temperatures ranging between 29°C and 33°C, the concentration of Type K Liquid Sodium Silicate of Philadelphia Quartz Co. can be determined with an accuracy of 0.037 percent for a variation in concentration of 1.5 percent. Accuracy in the measurement of concentration can be improved where the variation of sound velocity with temperature is less. For example, for this type of liquid sodium silicate, about 10°C is a good temperature for this purpose.

As various changes could be made in the above described apparatus without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A sing-around velocimeter for measuring the velocity of sound in a fluid comprising:
   a first electroacoustic transducer and a second electroacoustic transducer mounted in contact with the fluid and in fixed geometric relationship such that the sound path therebetween is fixed;
   means for applying pulsed electrical signals to the first electroacoustic transducer to produce corresponding pulsed sound signals for transmission through the fluid;
   means for amplifying the pulsed electrical signals converted from the pulsed sound signals received by the second electroacoustic transducer;
   means for detecting the amplified, pulsed electrical signals;
   first signal generating means;
   second signal generating means;
   latch means connected to the means for applying pulsed electrical signals, the first generating means and the second generating means such that the means for applying pulsed electrical signals is actuated when a pulsed electrical signal is detected within a predetermined time period and such that premature application of a pulsed electrical signal to the first electroacoustic transducer is prevented when spurious signals are received and such that a pulsed electrical signal is applied to the first electroacoustic transducer if no pulsed electrical signal is received within a predetermined period of time; and
   counting means for counting the pulses of the pulsed electrical signals.

2. The invention of claim 1 wherein:
   the electroacoustic transducers are mounted in a ring for immersion in the fluid;
   the ring having an inner wall and an outer wall and two openings therein from the outer wall to the inner wall;
   the first electroacoustic transducer being disc shaped and mounted in the ring so that one of its faces closes the first of the openings in the inner wall and so that the pulsed sound signals are directed toward a portion of the inner wall;
   the second electroacoustic transducer being disc shaped and mounted in the ring so that one of its faces closes the second of the openings in the inner wall and so that it is precluded from receiving sound signals directly from the first electroacoustic transducer;
   at least one reflector mounted in the inner wall placed such that the pulsed sound signals received directly from the first electroacoustic transducer are reflected toward the second electroacoustic transducer.

3. The invention of claim 2 wherein there is a third opening from the inner wall to the outer wall, a reflector assembly containing the reflector mounted so as to be rotatable therein and including means for locking the reflector assembly in place after obtaining the desired orientation of the reflector.

4. The invention of claim 3 wherein there is a fourth opening from the inner wall to the outer wall and there is a second reflector assembly containing a second reflector mounted so as to be rotatable therein and including means for locking the second reflector in place after obtaining the desired orientation of the second reflector.

5. The invention of claim 2 wherein there are at least two such reflectors mounted in the inner wall placed such that the sound signals from the first electroacoustic transducer are reflected serially from reflector to reflector, reaching the second electroacoustic transducer after having been reflected no more than once from each such reflector to thereby increase the length of the sound path.

6. The invention of claim 5 wherein there are two such reflectors and the length of the sound path is approximately equal to $r(4 + \sqrt{2})$ where r is the radius of the inner wall of the ring.

7. The invention of claim 6 wherein the inner wall of the ring is sloped such that any sound signal which does not impinge on the reflector is reflected by the inner wall so that it does not impinge on the second electroacoustic transducer.

8. The invention of claim 7 wherein:
   the ring comprises:
   a pair of solid arcuate members;
   a pair of elements having low acoustic transmission properties placed between the pair of arcuate members;
   clamping means for clamping the pair of solid arcuate members and the pair of elements together to form a ring wherein sound signals are precluded from being transmitted within the ring from one of the solid arcuate members to the other such member;
   the first electroacoustic transducer being mounted in one of said pair of solid arcuate members;
   the second electroacoustic transducer being mounted in the other of said pair of solid arcuate members so that the only sound signals which are received by the second electroacoustic transducer are those which have traversed the fluid in which the ring has been immersed.

9. A circuit for use in a sing-around velocimeter for measuring the velocity of sound in a medium using at least one electroacoustic transducer in contact with the medium comprising:
   a transducer driver for applying electrical signals to the electroacoustic transducer;
   amplifying means connected such that it receives electrical signals converted from the sound signals in the medium by the electroacoustic transducer;
   means for detecting the electrical signals from the amplifying means;
   a free running, signal generator;
   a reset signal generator;
   latch means connected to the detecting means, the free running, signal generator, the reset generator and the transducer driver such that the transducer driver is actuated by the reset signal generator if a sound signal is received within a predetermined period of time and the transducer driver is actuated by the free running, signal generator if a sound signal is not received in a predetermined period of time;
   output means for connection to a counter for measuring the elapsed time between initiation of successive electrical signals.

10. The invention of claim 9 including:

switch means having a first position and a second position;

calibration measuring means and adjusting means connected such that when the switch means is in the first position, the circuit operates to initiate sound signals and detect and count the same and when the switch means is in the second position, the calibration measuring means are connected to permit proper adjustment of the gain of the amplifying means by the adjusting means.

11. The invention of claim 10 wherein there are a first electroacoustic transducer and a second electroacoustic transducer and including:

a ring for immersion in the medium;

the ring having an inner wall and an outer wall and two openings therein from the outer wall to the inner wall;

the first electroacoustic transducer being disc shaped and mounted in the ring so that one of its faces closes the first of the openings in the inner wall and so that the pulsed sound signals are directed toward a portion of the inner wall;

the second electroacoustic transducer being disc shaped and mounted in the ring so that one of its faces closes the second of the openings in the inner wall and so that it is precluded from receiving sound signals directly from the first electroacoustic transducer;

at least one reflector mounted in the inner wall placed such that the pulsed sound signals received directly from the first electroacoustic transducer are reflected toward the second electroacoustic transducer.

12. The invention of claim 11 wherein there is a third opening from the inner wall to the outer wall, a reflector assembly containing the reflector mounted so as to be rotatable therein and including means for locking the reflector assembly in place after obtaining the desired orientation of the reflector.

13. The invention of claim 12 wherein there is a fourth opening from the inner wall to the outer wall and there is a second reflector assembly containing a second reflector mounted so as to be rotatable therein and including means for locking the second reflector in place after obtaining the desired orientation of the second reflector.

14. The invention of claim 11 wherein there are at least two such reflectors mounted in the inner wall placed such that the sound signals from the first electroacoustic transducer are reflected serially from reflector to reflector, reaching the second electroacoustic transducer after having been reflected no more than once from each such reflector to thereby increase the length of the sound path.

15. The invention of claim 14 wherein there are two such reflectors and the length of the sound path is approximately equal to $r(4 + \sqrt{2})$ where $r$ is the radius of the inner wall of the ring.

16. The invention of claim 15 wherein the inner wall of the ring is sloped such that any sound signal which does not impinge on the reflector is reflected by the inner wall so that it does not impinge on the second electroacoustic transducer.

17. The invention of claim 16 wherein:

the ring comprises:

a pair of solid arcuate members;

a pair of elements having low acoustic transmission properties placed between the pair of arcuate members;

clamping means for clamping the pair of solid arcuate members and the pair of elements together to form a ring wherein sound signals are precluded from being transmitted within the ring from one of the solid arcuate members to the other such member;

the first electroacoustic transducer being mounted in one of said pair of solid arcuate members;

the second electroacoustic transducer being mounted in the other of said pair of solid arcuate members so that the only sound signals which are received by the second electroacoustic transducer are those which have traversed the fluid in which the ring has been immersed.

* * * * *